ELECTRO-OPTICAL LIGHT MODULATOR

Filed Oct. 1, 1965

INVENTORS
HANS JAFFE
LEBO R. SHIOZAWA
TODD R. SLIKER 3,531,179
ELECTRO-OPTICAL LIGHT MODULATOR
Hans Jaffe, Cleveland Heights, Lebo R. Shiozawa, Richmond Heights, and Todd R. Sliker, East Cleveland, Ohio, assignors to Clevite Corporation, a corporation of Ohio
Filed Oct. 1, 1965, Ser. No. 492,248
Int. Cl. G02f 1/26
U.S. Cl. 350—150                                5 Claims

ABSTRACT OF THE DISCLOSURE

There is disclosed an electro-optical crystal element for use in an apparatus for modulating polarized light, said crystal element comprising a cubic zinc telluride crystal having an effective concentration of acceptors such as to possess a high resistivity exceeding $10^5$ ohm-cm. and electrode means on opposite surfaces of said crystal. The zinc telluride crystal is formed from zinc telluride crystalline powder, to which is added a donor impurity, by sublimation and vapor deposition. Fluid phase of zinc and tellurium can be also used to grow zinc telluride crystals.

---

This invention relates to apparatus for modulating polarized light and, more specifically, to an improved electro-optical crystal element for use in such apparatus.

Systems for modulating polarized light are well-known in the art. Such systems typically comprise a source of polarized light arranged to direct a light beam to an electro-optical crystal having desired light transmitting properties in a selected portion of the frequency spectrum. An electric field may be applied to the crystal perpendicular or parallel to the direction of light depending on the crystal class to produce a variable electro-optic effect dependent on the magnitude of the electric field to thereby affect the state of polarization of the light beam transmitted by the crystal. This change in state of the polarization may be converted to intensity modulation by means of an analyzer. For a complete disclosure of such a typical light modulating and a television apparatus employing the same reference is made to U.S. Pat. No. 2,616,962 to Hans Jaffe. Alternatively, the light emerging from the crystal may be deflected in a manner depending on its state of polarization as disclosed by Kulke et al. in IBM Journal of Research and Development, vol. 8, pages 64–67 (1964). The modulation of the light beam in the crystal may also be detected directly as frequency modulation by means of a photo-cell as disclosed by Peters in "Gegacycle Bandwidth Coherent Light Traveling Wave Phase Modulator," Proceedings of the IEEE, vol. 51, page 147 (1963).

All crystals which, by their symmetry, are piezoelectric can be expected to show a linear electro-optic effect. In fact it has been contended that a direct relationship exists between the linear electro-optic effect and piezoelectricity. (Piezoelectricity, Cady, 1946, page 721). In the past, crystals which possessed strong piezoelectric properties were believed to possess useable electro-optical properties and such predictions have been supported by research in regard to various piezoelectric crystals. For example, electro-optic effects have been observed in piezoelectric crystalline materials such as ammonium dihydrogen phosphate, quartz, cubic zinc sulfide and cubic zinc selenide.

The present invention is concerned with the electro-optical properties of crystals within the class $\bar{4}3m$ of the cubic system. Specifically, we have discovered that cubic zinc telluride when modified to compensate for a high concentration of acceptors possesses electro-optical properties uniquely different and superior to the electro-optical properties of other class $\bar{4}3m$ cubic crystals.

For practical applications it is essential that an electro-optical crystal possesses a relatively high resistivity in addition to significant electro-optical properties. If the crystal is subjected to an intermittent electric field a resistivity as low as $10^5$ ohm-cm. may suffice. If a continuous electric field is applied a resistivity exceeding $10^7$ ohm-cm. is desirable. Lower resistivities will result in an electrical current of magnitude sufficient to cause overheating of the crystal.

Relatively pure zinc sulfide and zinc selenide which possess significant piezoelectric properties are known to possess electro-optical properties. Cubic zinc sulfide for example has been reported to have an electro-optical constant $r_{41}$ of $2.0 \times 10^{-12}$ m./V. at a wavelength of 546 nm. (1 nm. = .001 micron) and an electromechanical coupling coefficient of 0.079. Cubic zinc selenide has been reported to have an electro-optical constant $r_{41}$ of $2.0 \times 10^{-12}$ m./V. at a wavelength of 546 nm. and an electro-mechanical coupling coefficient of 0.026. In addition crystals of both materials inherently possess a relatively high resistivity making them suitable for electro-optical modulating apparatus.

Cubic zinc telluride crystals on the other hand possess an electromechanical coupling coefficient of only 0.017 and a resistivity of only 10 ohm-cm. in a relatively pure state. Accordingly, heretofore zinc telluride crystals have not been considered a suitable material for an electro-optical crystal element particularly in view of its low resistivity. We have found, however, that zinc telluride crystals modified to have a relatively high resistivity possess electro-optical properties uniquely different from and superior to other class $\bar{4}3m$ crystals.

It is, accordingly, the principal object of the present invention to provide an electro-optical crystal element comprising cubic zinc telluride.

Another object of the invention is to provide an electro-optical crystal element consisting essentially of a zinc telluride crystal having a resistivity exceeding $10^5$ ohm-cm.

Other objects and advantages will become apparent from the following description taken in connection with the accompanying drawings wherein.

Figure 1:
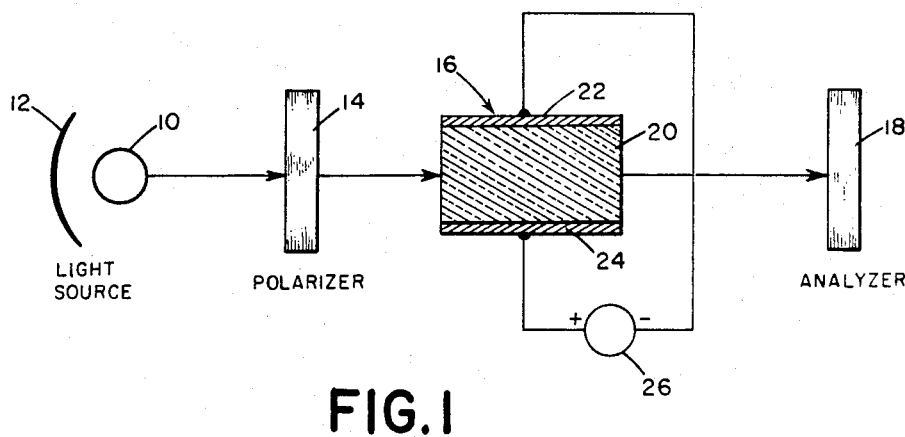
FIG. 1 is a schematic illustration of a polarized light electro-optical modulating system embodying the invention.

Referring now to FIG. 1 of the drawings, there is shown schematically a light modulating apparatus incorporating a crystal element embodying the invention. Specifically, a light source 10 and mirror 12 are arranged to direct a beam of light through a light polarizer 14 to an electro-optical crystal element identified generally by the reference numeral 16. The crystal element 16 is effective to vary the polarization of the light transmitted thereby in response to an applied electric field. An analyzer 18 is provided for light transmitted by the crystal element 16 and is effective to detect the state of polarization. This basic light modulating system is typical of those known in the prior art and further description is deemed unnecessary.

Referring now specifically to the crystal element 16, this component comprises a plate 20 consisting of a zinc telluride class $\bar{4}3m$ cubic crystal. Such a crystal plate may be cut from a crystal structure grown in the manner hereinafter described.

Zinc telluride crystals may be grown from a fluid phase containing zinc telluride such as by deposition from a vapor phase, solidification from a molten phase or by deposition through use of a transport agent. The preferred process is simple sublimation and deposition of zinc telluride and the description will be in reference thereto.

Zinc telluride crystals as normally grown possess a low dark resistivity in the order of 10 ohm-cm. due to a deficiency of zinc atoms which impart p-type conductivity to the crystal. We have found that the resistivity can be substantially increased by lowering the effective concentration of acceptors. This can be accomplished by incorporating in the crystal during growth a donor impurity comprising at least one element selected from the group consisting of aluminum, gallium, indium and chlorine. Good results have been achieved with indium. Another suitable method of achieving a lower effective concentration of acceptors is the heat treating of the crystal in an atmosphere of zinc vapor at a pressure in excess of the partial pressure of zinc corresponding to the minimum vapor pressure of zinc telluride at the heat treating temperature. By either process or a combination of both the resistivity of the crystal can be increased to over $10^7$ ohm-cm.

High resistivity doped zinc telluride crystals were prepared using the following specific process. High purity zinc telluride polycrystalline powder was initially mixed with a donor dopant powder consisting of indium telluride $In_2Te_3$ in proportions of approximately 20 parts $In_2Te_3$ per million parts ZnTe by weight. A quantity of the resulting mixture was sintered into an aggregate mass and then placed in a closed vessel comprising a fused quartz tube and sublimed at a temperature of approximately 1250° C. During the sublimation process the doped zinc telluride material was vapor deposited in a cooler region of the quartz tube in the form of an aggregate of large crystals. A plate similar in configuration to plate 20 was cut from the crystals thus formed. As a result of doping with a donor in the manner described the crystal plate was found to have a resistivity exceeding $10^7$ ohm-cm.

Similar crystal resistivities were achieved using the heat treating process. In this case high purity undoped zinc telluride polycrystalline powder was sintered into an aggregate mass and then sublimed at a temperature of approximately 1250° C. in a fused quartz tube to form an aggregate of large crystals by vapor deposition. A plate cut from the crystal mass was then heat treated in an atmosphere of zinc vapor at a pressure of approximately 1 atmosphere at a temperature of approximately 850° C. followed by rapid cooling to room temperature. After the heat treatment the crystal plate possessed a resistivity exceeding $10^7$ ohm-cm.

It will be apparent to those skilled in the art that the heat treatment in a zinc atmosphere may be applied to doped crystals to achieve crystals having specific resistivity characteristics. It will also be apparent that the specific processes disclosed may be variously modified and that the specific pressures, temperatures, etc., disclosed are merely exemplary in nature and may be varied within a substantial range to accommodate specific process conveniences.

Figure 2:
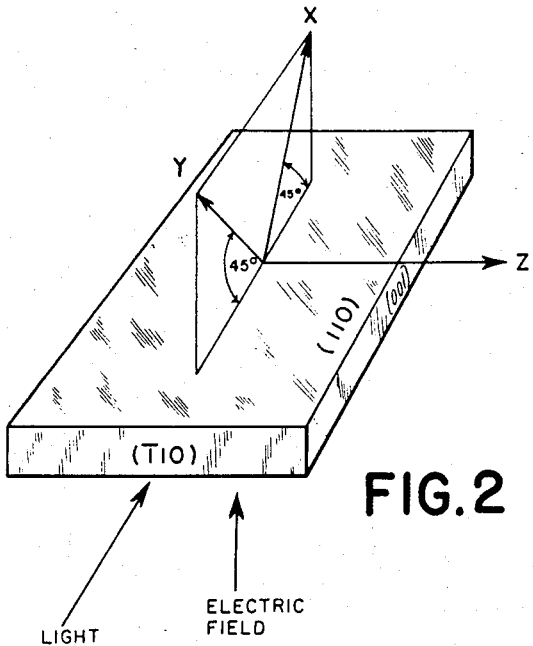
FIG. 2 is a schematic illustration of a crystal element embodying the invention showing one crystallographic orientation thereof.

In FIG. 2 of the drawings we have illustrated a preferred orientation of the plate 20 with respect to the XYZ axes and the direction of application of electrical field and light. The Miller indices of crystallographic orientation are indicated on the appropriate faces of the plate 20. The crystallographic orientation is such that light is directed perpendicular to the ($\bar{1}100$) face of the plate and the electrical field is applied to the (110) face.

It will be apparent to those skilled in the art that configurations other than that shown in FIGS. 1 and 2 are possible for both transverse and longitudinal modulators. For example both the electric field and direction of light could be in the [001] direction.

An electric field may be applied to the plate 20 by various known techniques such as by a pair of opposed electrodes 22 and 24 applied to the opposite face surfaces as shown in FIG. 1. Alternatively, an electric field can be established by the impingement of an electron beam on one surface by employing means similar to that disclosed in U.S. Pat. No. 2,277,007.

In FIG. 1 electrodes 22 and 24 are illustrated as being electrically connected to the positive and negative terminals, respectively, of a direct voltage source 26. With the plate 20 oriented crystallographically as depicted in FIG. 2 a variation in potential of the source 26 will cause a corresponding variation in the electric field resulting in a change in polarization of the light transmitted by the plate 20.

The electro-optical properties of a zinc telluride crystal element embodying the invention were determined using a sample similar in configuration to plate 20 electroded with air-dry silver paint on the (110) and ($\bar{1}10$) face surfaces and placed between parallel linear polarizers. The test sample had a resistivity of $4 \times 10^8$ ohm-cm. and was doped with indium during growth by means of the process hereinbefore described. The dimensions of the sample parallel to the [110], [$\bar{1}10$] and [001] directions were 1.24, 2.65 and 4.30 mm., respectively. Light with a bandwidth of .0017 nm. was transmitted through the sample in the [$\bar{1}10$] direction.

When the axis of the polarizer is parallel to the [110] direction the retardation Γ in fractions of a wavelength may be expressed by the equation:

$$\Gamma = n^3 r_{41} Vl/\lambda d \quad (1)$$

where $n$ is the index of refraction, $r_{41}$ is the electro-optical constant, V is the applied voltage, $\lambda$ is the wavelength of light in air, $l$ is the crystal dimension in the direction of light and $d$ is the crystal dimension in the direction of application of electric field. The quantity $V_{1/2}$ which represents the half wave voltage for a cubic sample with electric field parallel to [110] may be expressed as follows:

$$V_{1/2} = \lambda/2n^3 r_{41} \quad (2)$$

The magnitude of the half wave voltage $V_{1/2}$ was determined by slowly applying a D.C. voltage to the sample until the transmitted light was visually observed to pass through an intensity minimum corresponding to $\Gamma = \frac{1}{2}$. Values of voltage necessary to effect a transition from 4 to 100 percent transmission were measured as a function of wavelength. From a consideration of the sample dimensions it was then possible to determine values of $V_{1/2}$.

Values of the electro-optical constant $r_{41}$ as a function of wavelength were computed using Equation 2 above and the values of $V_{1/2}$ determined by the above described measurements and calculations. The refractive index $n$ was determined by the prism refraction method.

Figure 3:
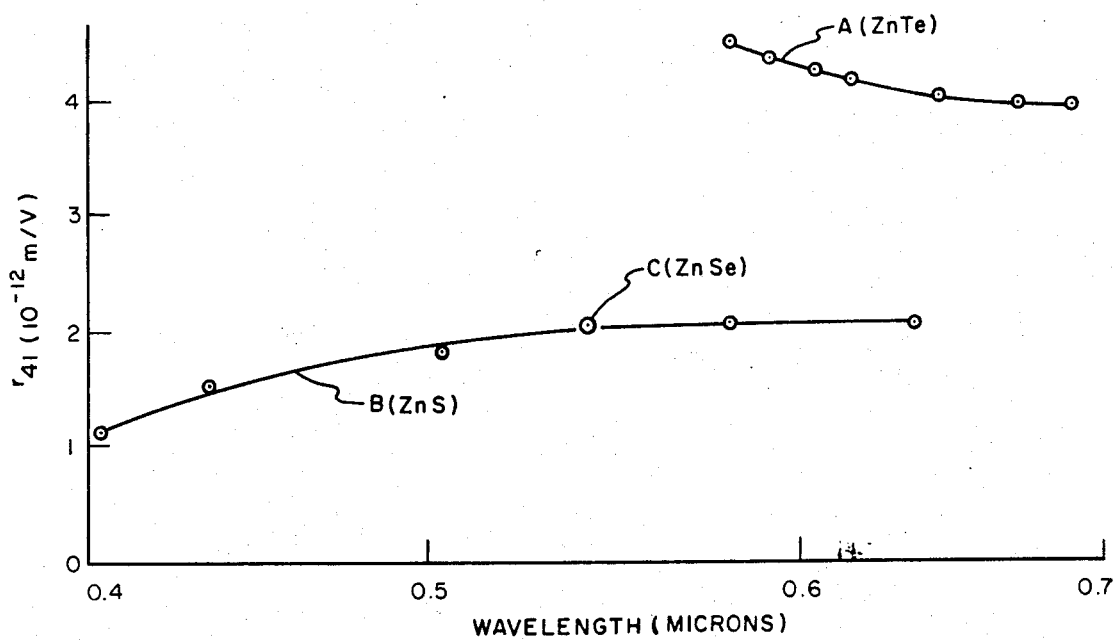

Referring to FIG. 3 of the drawing the values of $r_{41}$ for the zinc telluride sample determined in the above manner are depicted as a function of wavelength by curve A. Curve B and point C illustrate reported electro-optical constants $r_{41}$ for zinc sulfide and zinc selenide, respectively. It will be observed that the values for zinc telluride are substantially higher in magnitude than for zinc sulfide and zinc selenide. It will also be noted that for zinc telluride the electro-optic constant $r_{41}$ decreases with increasing wavelength whereas the constants for zinc sulfide increase with increasing wavelength.

Figure 4:
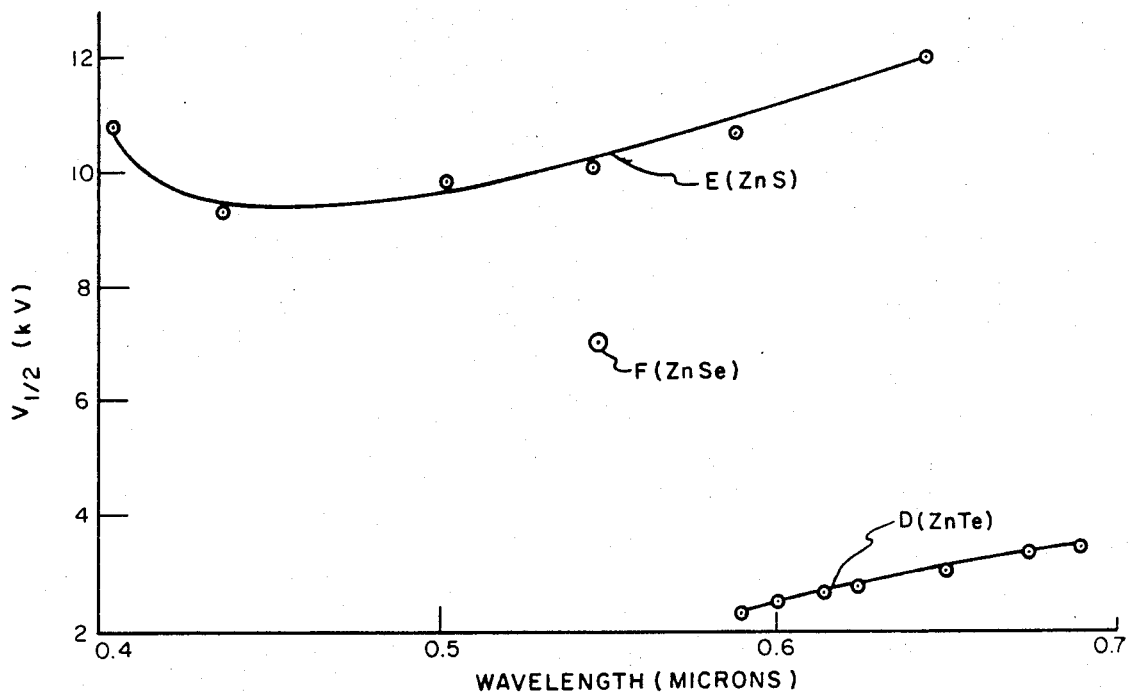
FIGS. 3 and 4 are curves graphically comparing the characteristics achieved with the invention and characteristics of prior art crystal elements.

In FIG. 4 of the drawings the values of $V_{1/2}$ determined for the test sample are depicted as a function of wavelength and identified by curve D. Curve E and point F illustrate the reported values of $V_{1/2}$ for zinc sulfide and zinc selenide, respectively. In this case it will be observed that $V_{1/2}$ for zinc telluride is only about ⅓ as large as for zinc sulfide.

FIGS. 3 and 4 clearly indicate the superior electro-optical properties of a zinc telluride crystal element in accordance with the invention and its utility as a crystal element in an electro-optical modulating system of the type shown in FIG. 1. Specifically a crystal element in accordance with the present invention requires a substantially smaller electric field than prior art crystals while possessing a substantially higher electro-optical constant.

The invention has particular utility in the wavelength range between about 580 nm. to 700 nm. which includes the wavelength of widely used helium-neon and ruby lasers.

The invention is also believed to possess utility in the modulation of infrared light. Specifically zinc telluride is transparent up to wavelengths of 52 microns whereas zinc sulfide becomes opaque at 32 microns and zinc selenide becomes opaque at 46 microns.

It is claimed and desired to secure by Letters Patent of the United States:

1. An electro-optical light modulator comprising a class $\bar{4}3m$ crystal element having electrodes attached to opposite faces thereof, and consisting essentially of a cubic zinc telluride crystal having an effective concentration of acceptors such as to possess a resistivity exceeding $10^5$ ohm-cm. and an electro-optical constant $r_{41}$ exceeding $3.8 \times 10^{-12}$ m./V. at wavelengths of from 580 to 700 nm.

2. In a system for mdoulating polarized light having a light source, a mirror, a polarizer, an analyzer, and an electro-optical light modulator comprising in combination a class $\bar{4}3m$ crystal element consisting essentially of cubic zinc telluride having electrodes attached to opposite surfaces thereof.

3. In a system for modulating polarized light as described in claim 2 wherein said cubic zinc telluride crystal element is further characterized by having a resistivity exceeding $10^5$ ohm-cm., an electro-optical constant $r_{41}$ exceeding $3.8 \times 10^{-12}$ m./V. at wavelengths from 580 to 700 nm.

4. In a system for modulating polarized light having a polarized light source, an analyzer, and an electro-optical light modulator comprising in combination a class $\bar{4}3m$ crystal element consisting essentially of cubic zinc telluride having electrodes attached to opposite surfaces thereof.

5. In a system for modulating polarized light as described in claim 4 wherein said cubic zinc telluride crystal element is further characterized by having a resistivity exceeding $10^5$ ohm-cm., an electro-optical constant $r_{41}$ exceeding $3.8 \times 10^{-12}$ m./V. at wavelengths from 580 to 700 nm.

References Cited

UNITED STATES PATENTS 3,188,594  6/1965  Koller et al.

OTHER REFERENCES

Bass et al., "Optical Rectification" Physical Review, vol. 138, No. 2A (Apr. 19, 1965), pp. A534–A542.

DAVID SCHONBERG, Primary Examiner

PAUL R. MILLER, Assistant Examiner

U.S. Cl. X.R.

252—301.6; 350—147, 149